(12) United States Patent
Pieschel et al.

(10) Patent No.: US 7,390,065 B2
(45) Date of Patent: Jun. 24, 2008

(54) DUMPING UTILITY CART

(75) Inventors: Frank Pieschel, Apple Valley, MN (US);
Craig L. Stewart, Noblesville, IN (US)

(73) Assignee: Tricam Industries, Inc., Eden Prairie, MN (US)

( * ) Notice: Subject to any disclaimer, the term of this patent is extended or adjusted under 35 U.S.C. 154(b) by 29 days.

(21) Appl. No.: 10/977,254

(22) Filed: Oct. 29, 2004

(65) Prior Publication Data

US 2005/0057020 A1 Mar. 17, 2005

Related U.S. Application Data

(62) Division of application No. 10/395,010, filed on Mar. 21, 2003, now Pat. No. 6,851,756.

(51) Int. Cl.
*B60P 1/12* (2006.01)
(52) U.S. Cl. .......................... 298/2; 298/17 R; 298/17.5; 298/17.8
(58) Field of Classification Search .................... 298/2, 298/11, 17 R, 17.5, 17.8, 17 T; 280/47.17, 280/47.18, 47.26; 414/482
See application file for complete search history.

(56) References Cited

U.S. PATENT DOCUMENTS

| 74,131 | A | 2/1868 | Priest |
|---|---|---|---|
| 115,244 | A | 5/1871 | Skeen |
| 128,429 | A * | 6/1872 | Skeen ........................ 298/17 R |
| 1,659,245 | A | 2/1928 | Delker |
| 3,000,671 | A | 9/1961 | Monegato |
| 3,281,186 | A | 10/1966 | Davis |
| 3,833,263 | A | 9/1974 | Jackson |
| 4,511,181 | A | 4/1985 | Schantz |
| 4,711,499 | A | 12/1987 | Fortin |
| 4,889,390 | A | 12/1989 | Campbell |
| 5,350,030 | A | 9/1994 | Mawhinney et al. |
| 5,395,163 | A | 3/1995 | Mandell et al. |
| 5,439,239 | A | 8/1995 | Su |
| 5,544,944 | A | 8/1996 | Keech |
| 6,290,301 | B1 | 9/2001 | Bockman |
| 6,851,756 | B2 * | 2/2005 | Pieschel ........................ 298/2 |
| 2005/0057020 | A1 | 3/2005 | Pieschel |

FOREIGN PATENT DOCUMENTS

SU 1830013 A3 7/1993

OTHER PUBLICATIONS

World Factory Poly Cart (4 pages) no date.

* cited by examiner

*Primary Examiner*—Stephen Gordon
(74) *Attorney, Agent, or Firm*—Patterson, Thuente, Skaar & Christensen, P.A.

(57) ABSTRACT

A dumping cart having an article retaining bed, a first set of wheels, a second set of wheels and a chassis. The first set of wheels is operably attached to the article retaining bed. The second set of wheels is operably attached to the chassis. The chassis is pivotally attached to the article retaining bed intermediate the first set of wheels and the second set of wheels.

19 Claims, 9 Drawing Sheets

DUMPING UTILITY CART

PRIORITY INFORMATION

This application is a divisional of U.S. patent application Ser. No. 10/395,010, filed Mar. 21, 2003, now U.S. Pat. No. 6,851,756, entitled DUMPING UTILITY CART. The entire contents of this application are incorporated herein by this reference.

FIELD OF THE INVENTION

The invention relates generally to vehicles used for transporting and dumping articles. More particularly, the present invention relates to an improved dumping utility cart designed for cost effectively transporting and dumping articles.

BACKGROUND OF THE INVENTION

It is often desirable to transport cumbersome articles, through the use of a vehicle, from point A to point B that could not otherwise be easily transported by one or more individuals. Furthermore, it is desirable to transport and easily dump various types of particulate matter, such as dirt, loose gravel, and livestock feed as well as a multitude of other articles. Such a vehicle may function as a trailer towed behind a motorized vehicle, towed by a person, or self-propelled.

There are many forms of vehicles that have been used for carrying and dumping a variety of items. Many of which contain a relatively flat bed used to contain the articles in transit and a pivoting mechanism for slidably removing the articles from the bed to an alternate location.

Various mechanisms have been employed to transfer cumbersome cargo from the transport vehicle to another location. Manual unloading has been used. However, multitudes of pivoting mechanisms have been exploited to achieve the desired dumping. Placement of the pivot and the size of the dumping vehicle vary considerably throughout the prior art. Larger vehicles employ pneumatic cylinders and hydraulics to pivot the bed and allow for dumping of the articles transported.

Dumping carts and hinging trailers are known, including those of the following patents: U.S. Pat. No. 5,544,944 to Keech; U.S. Pat. No. 6,290,301 to Bockman; U.S. Pat. No. 3,833,263 to Jackson; U.S. Pat. No. 4,711,499 to Fortin; U.S. Pat. No. 4,889,390 to Campbell; and U.S. Pat. No. 5,395,163. The desirable elements of the present invention are neither taught nor disclosed in the prior art. The present invention is therefore a useful improvement upon the prior art of record.

SUMMARY OF THE INVENTION

A dumping utility cart of the present invention includes an article retaining bed having a front end and a rear end. The article retaining bed is pivotally attached to chassis intermediate a front set of wheels and a rear set of wheels. The front set of wheels is rotatably attached to the chassis. The rear set of wheels is rotatably attached to the article retaining bed proximal to the rear end.

When it is desired to empty the contents of the dumping utility cart a locking means is unlocked to allow the article retaining bed to pivot with respect to the chassis. The contents subsequently are released from the article retaining bed through the assistance of gravity. The article retaining bed is designed to pivot up to approximately 90° in relation to the chassis, such that the article retaining bed's surface is substantially perpendicular to that of the ground.

DETAILED DESCRIPTION OF THE PREFERRED EMBODIMENT

Figure 1:
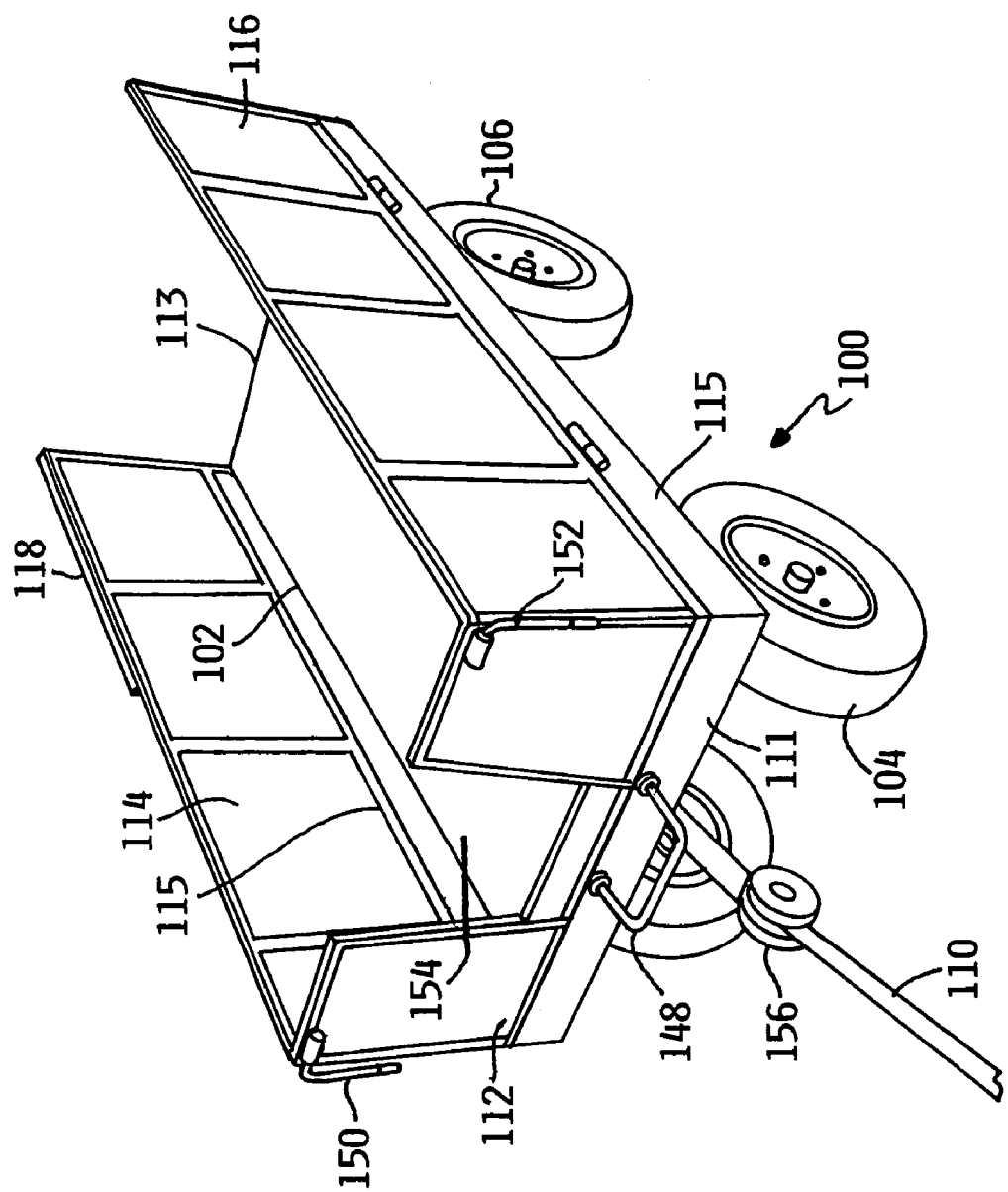
FIG. 1 is a perspective view of a dumping utility cart in a transport position.

Referring to FIGS. 1-9, a dumping utility cart of the present invention is generally designated in the drawings by the reference numeral 100. The dumping utility cart 100 contains an article retaining bed 102, a front set of wheels 104, a rear set of wheels 106, a chassis 108, and a handle 110.

The dumping utility cart 100 of the present invention enables items to be readily transported to a desired location and then removed from the dumping utility cart 100 by pivoting the article retaining bed 102 with respect to the chassis 108. Because the chassis 108 pivots at a point that is intermediate to the front set of wheels 104 and the rear set of wheels 106, the amount of force needed to pivot the article retaining bed 102 is greatly reduced when compared with prior art utility carts.

The article retaining bed 102 preferably has a generally rectangular configuration with a front end 111, a rear end 113, and a pair of sides 115 that extend between the front end 111 and the rear end 113. However, a person of ordinary skill in the art will appreciate that it is possible to use the concepts of the present invention with alternative bed configurations.

The article retaining bed 102 preferably has a substantially flat upper surface. Depending on the size of the article retaining bed 102, reinforcing beams (not shown) may be provided around an outer edge of the article retaining bed 102 or extending across a central region of the article retaining bed 102.

The article retaining bed 102 may be made of a variety of materials including but not limited to steel, aluminum, and molded composite plastic. A smooth friction-reducing surface has been found particularly well suited for the present invention. The friction-reducing surface allows for greater ease of dumping cumbersome articles contained within the dumping utility cart 100.

Figure 2:
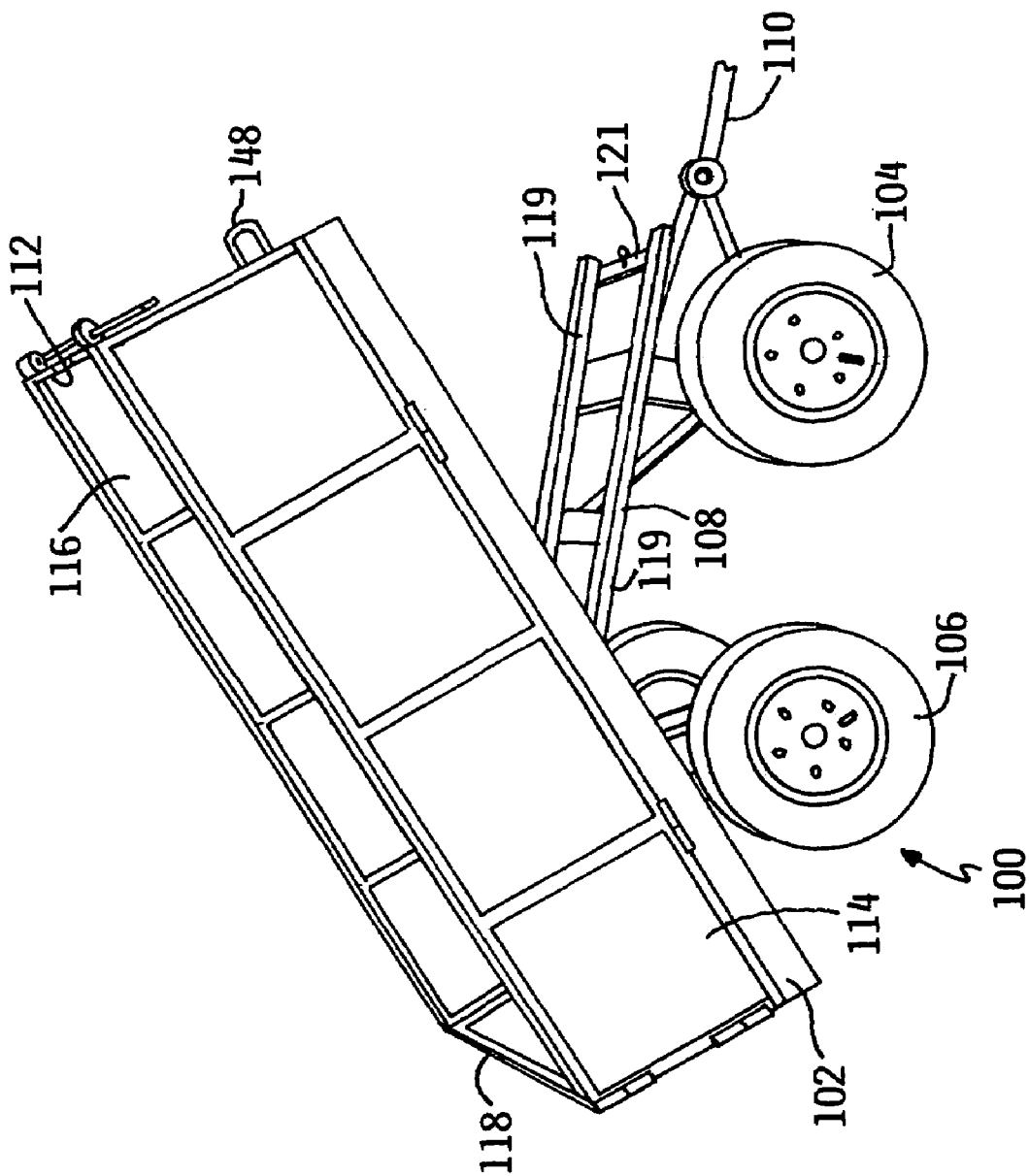
FIG. 2 is a side view of the dumping utility cart in a partially raised position.
Figure 3:
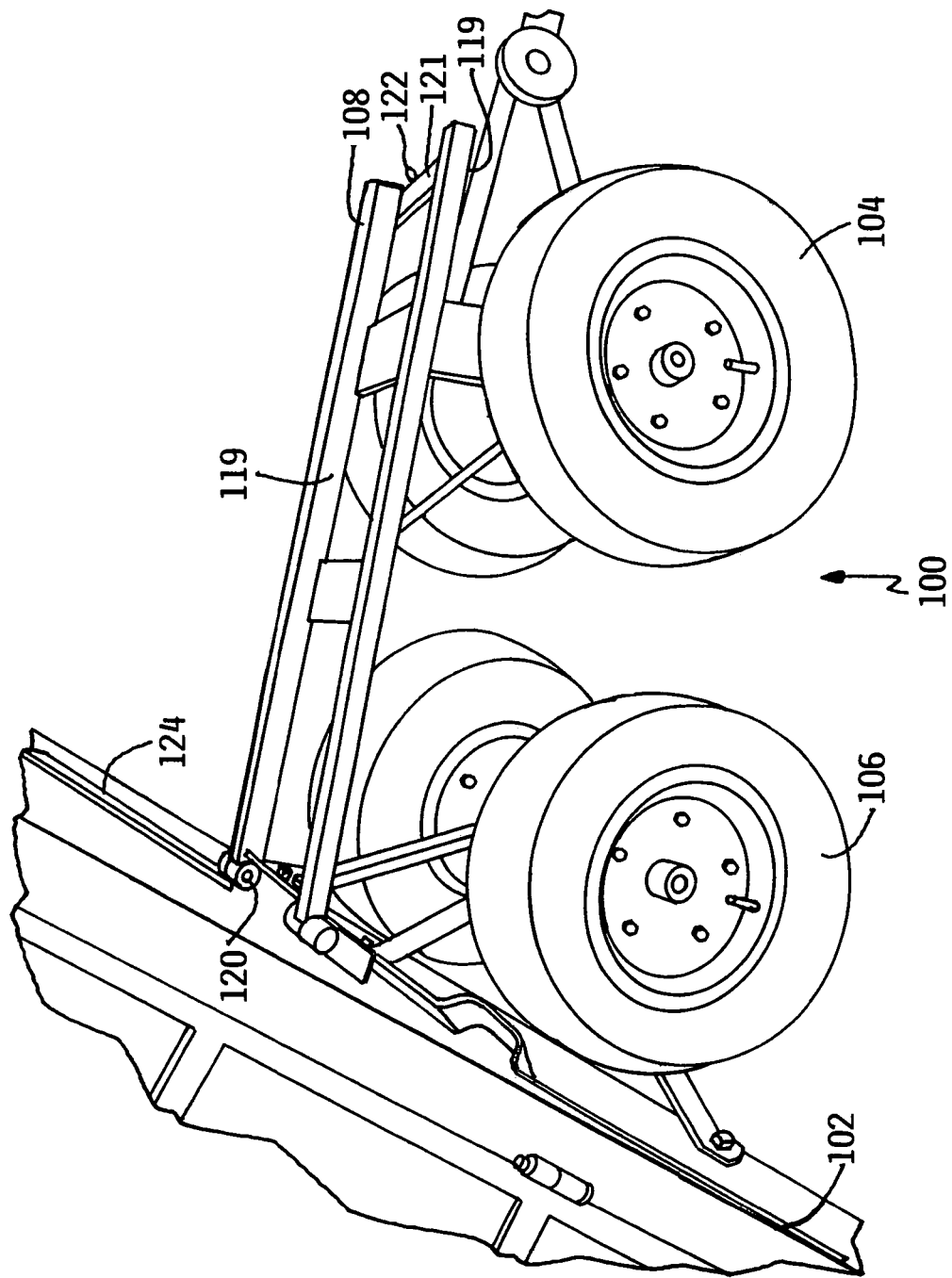
FIG. 3 is a side view of the dumping utility cart in a fully raised position.

The chassis 108 preferably includes a pair of side rails 119 and a plurality of braces 121 that extend between the side rails 119, as most clearly illustrated in FIGS. 2 and 3. The configuration of the side rails 119 and the braces 121 is selected based upon the anticipated load that is to be carried by the dumping utility cart 100. The article retaining bed 102 is connected to the chassis 108 at pivot point 120 and at locking point 122. The pivot point 120 is located at an end of each side rail 119.

The chassis 108 is pivotally connected to the article retaining bed 102 for greater ease of dumping cumbersome articles. Proper positioning of the pivot in relation to the sets of wheels 104, 106 and the article retaining bed 102 will better enable a person to use the dumping utility cart 100. When properly positioned, the rear wheels 106 rotate under the article retaining bed 102 in the manner similar to that of a fulcrum.

By acting in this manner a relatively small amount of upward force may be employed to pivot the article retaining bed 102. As shown in FIG. 2, the pivot assisting handle 148 is employed to pivot the article retaining bed 102 and initiate the dumping process. In the process of dumping the wheel base decreases in length as a result of the pivot.

Figure 5:
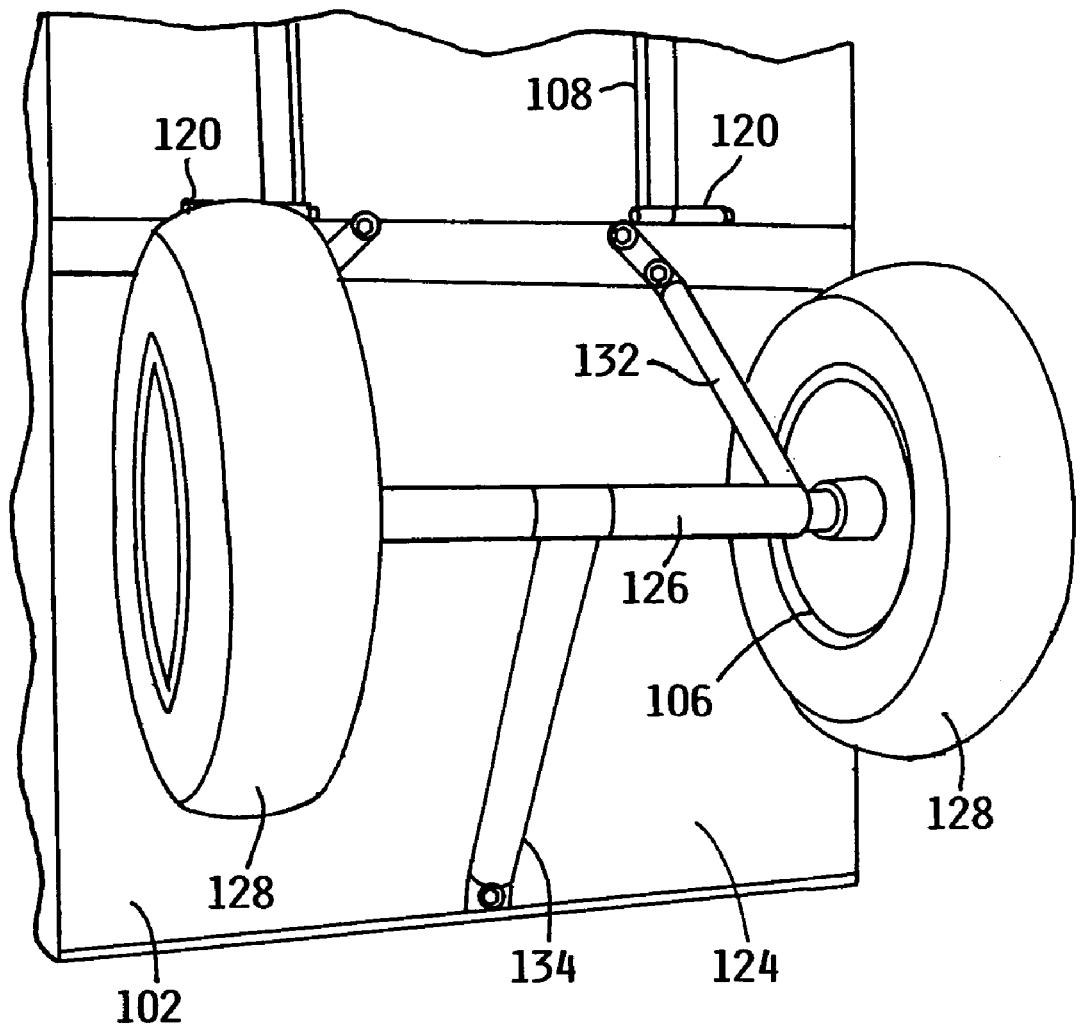
FIG. 5 is a bottom view of a rear set of wheels.

The rear set of wheels 106 are rotatably attached to the underside 124 of the article retaining bed 102, as most clearly illustrated in FIG. 5. In the preferred embodiment, the rear wheels 106 rotate about a rear axle 126. The length of the rear axle 126 is preferably less than the width of the article retaining bed 102. Tires 128 with inflatable inner tubes (not shown) have been found to be particularly well suited for use as the rear wheels 106.

To increase stability and durability, the rear wheels 106 are fixedly attached to the underside 124 of the article retaining bed 102 by at least one forward brace 132, at least one rear brace 134 and at least one intermediate brace 137.

The forward braces 132 extend from the rear axle 126 to the underside 124 of the article retaining bed 102 proximate the pivot point 120 at an angle of approximately 45 degrees. The at least one rear brace 134 extends from the rear axle 126 to the underside 124 of the article retaining bed 102 proximate the rear end 113 at an angle of approximately 45 degrees. The intermediate brace 137 extends substantially perpendicular from the underside 124 of the article retaining bed 102 to the rear axle 126.

Figure 6:
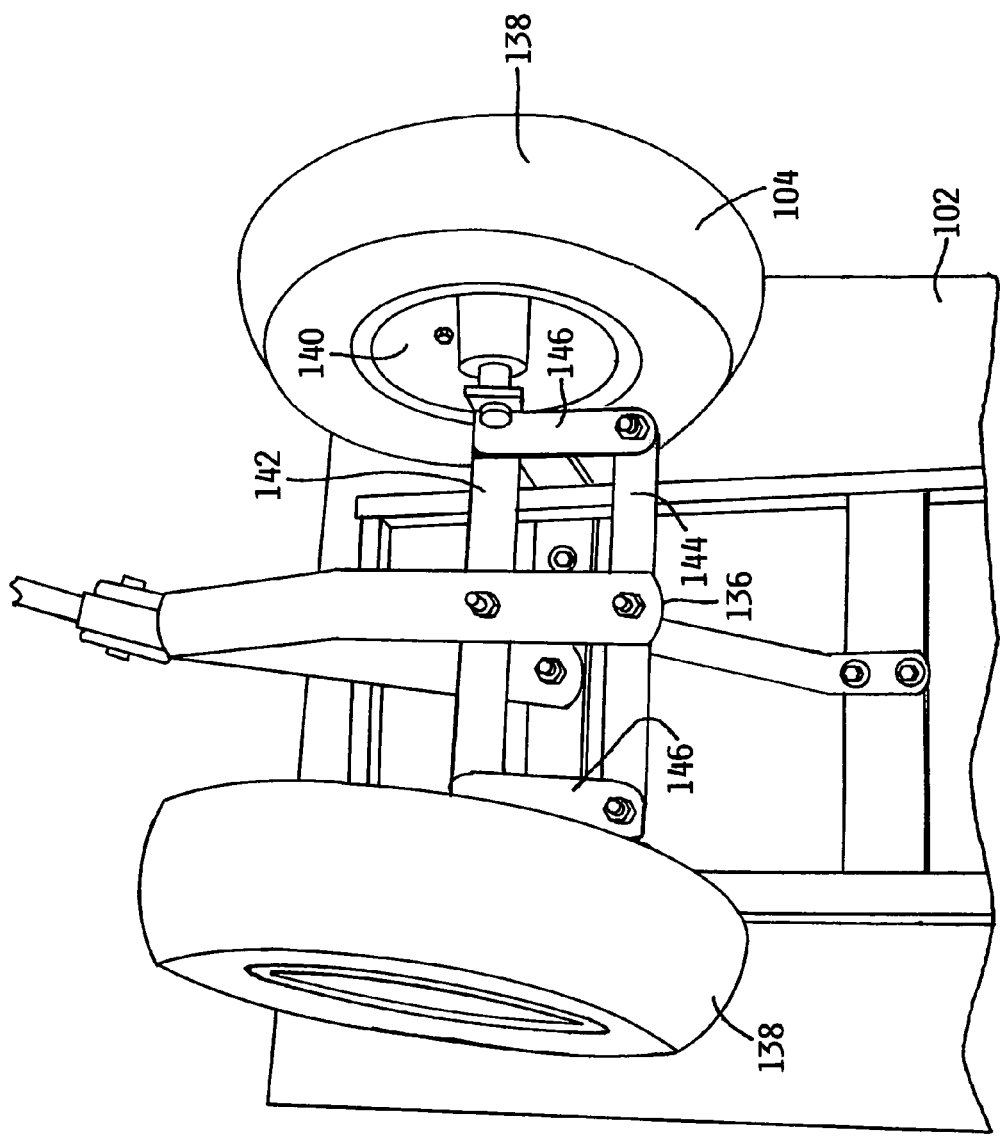
FIG. 6 is a bottom view of a front set of wheels.
Figure 7:
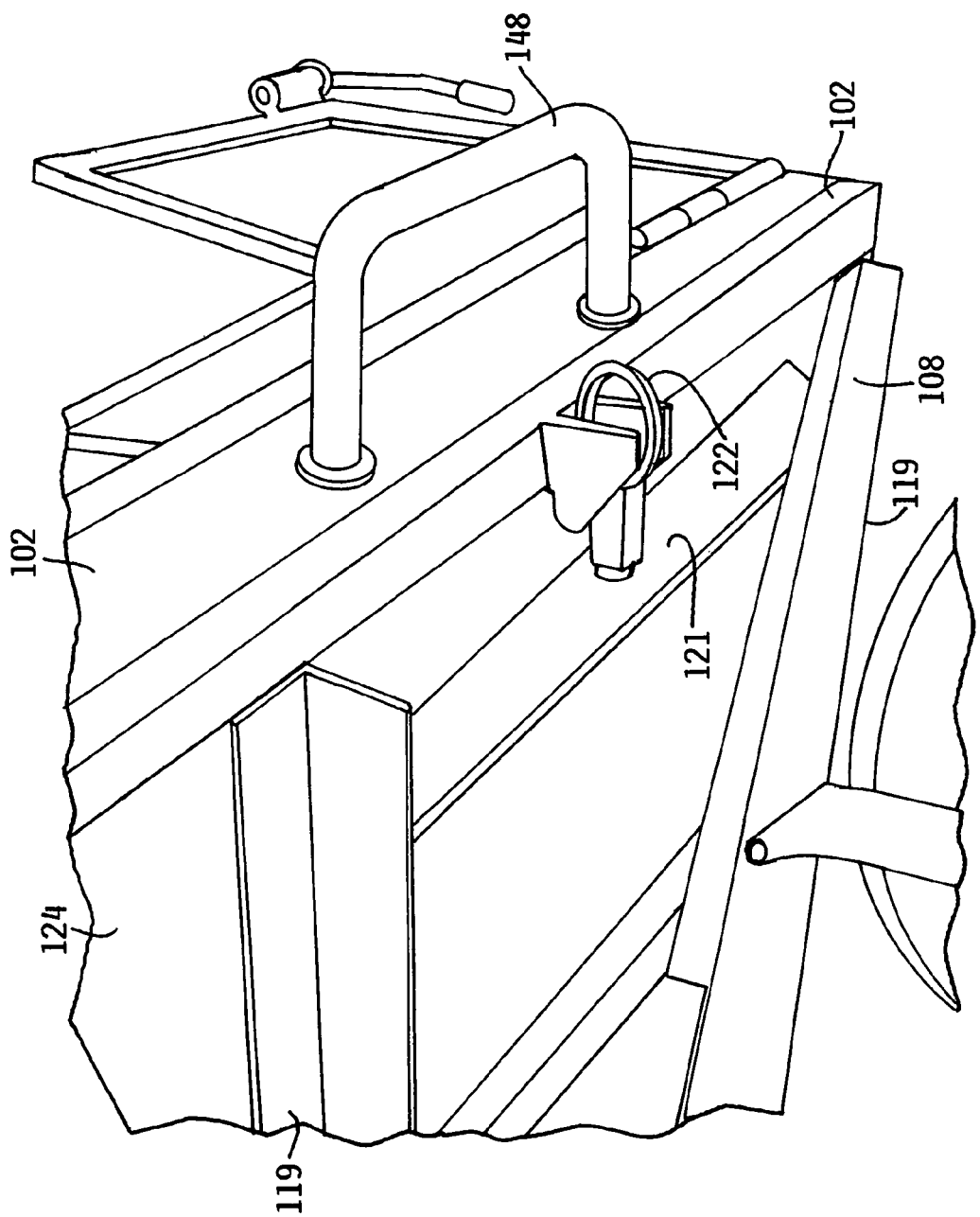
FIG. 7 is a perspective view of a first locking means.

The front set of wheels 104 are operably attached to the chassis 108, as most clearly illustrated in FIG. 6. The front set of wheels 104 comprises inflatable tires 138 and rims 140. The front set of wheels 104 are rotatably attached to a navigating mechanism 136. Pivotally attached to the navigating mechanism 136 is the navigating handle 110.

The navigating mechanism 136 comprises an axle bar 142, a pivot bar 144, and a set of connector bars 146. The handle 110 is pivotally attached to the axle bar 142, the pivot bar 144, and the chassis 108. The handle 110 may include a detachable mechanism 145 that permits the handle 110 to either be pulled by hand or attached to a tractor using a clevis. The connector bars 146 are parallel to the direction of travel and pivotally attached to the axle bar 142 and the pivot bar 144.

The connector bars 146 are proximal to the front wheels 104. The axle bar 142 is located in the axis of rotation for the front wheels 104 and is fixedly attached to the chassis 108 proximal to the front set of wheels 104.

To increase the capacity of the dumping utility cart 100, the article retaining bed 102 preferably has a front end wall 112, a pair of opposing side walls 114, 116, and a rear end wall 118. The front end wall 112, the side wall 114, 116 and the rear end wall 118 are preferably pivotable between an upwardly extending orientation (illustrated in FIG. 1) and a downwardly extending orientation (illustrated in FIG. 9).

The front end wall 112 is preferably pivotally attached to the article retaining bed 102. The front end wall 112 spans the width of the cart 100. A navigating handle slot 154 is preferably cutout of the front end wall 112 to allow downward pivot of the front end wall 112 while maintaining substantially free movement of the navigating handle 110. Positioned beneath the front end wall 112 on the front end of the dumping utility cart 100, equidistant from the ends of the article retaining bed 102, is a pivot assisting handle 148, as most clearly illustrated in FIG. 7.

Side walls 114, 116 are preferably pivotally attached to the article retaining bed 102. The side walls 114, 116 may also be fixedly attached to the front end wall 112 by wall connectors 150, 152.

Figure 8:
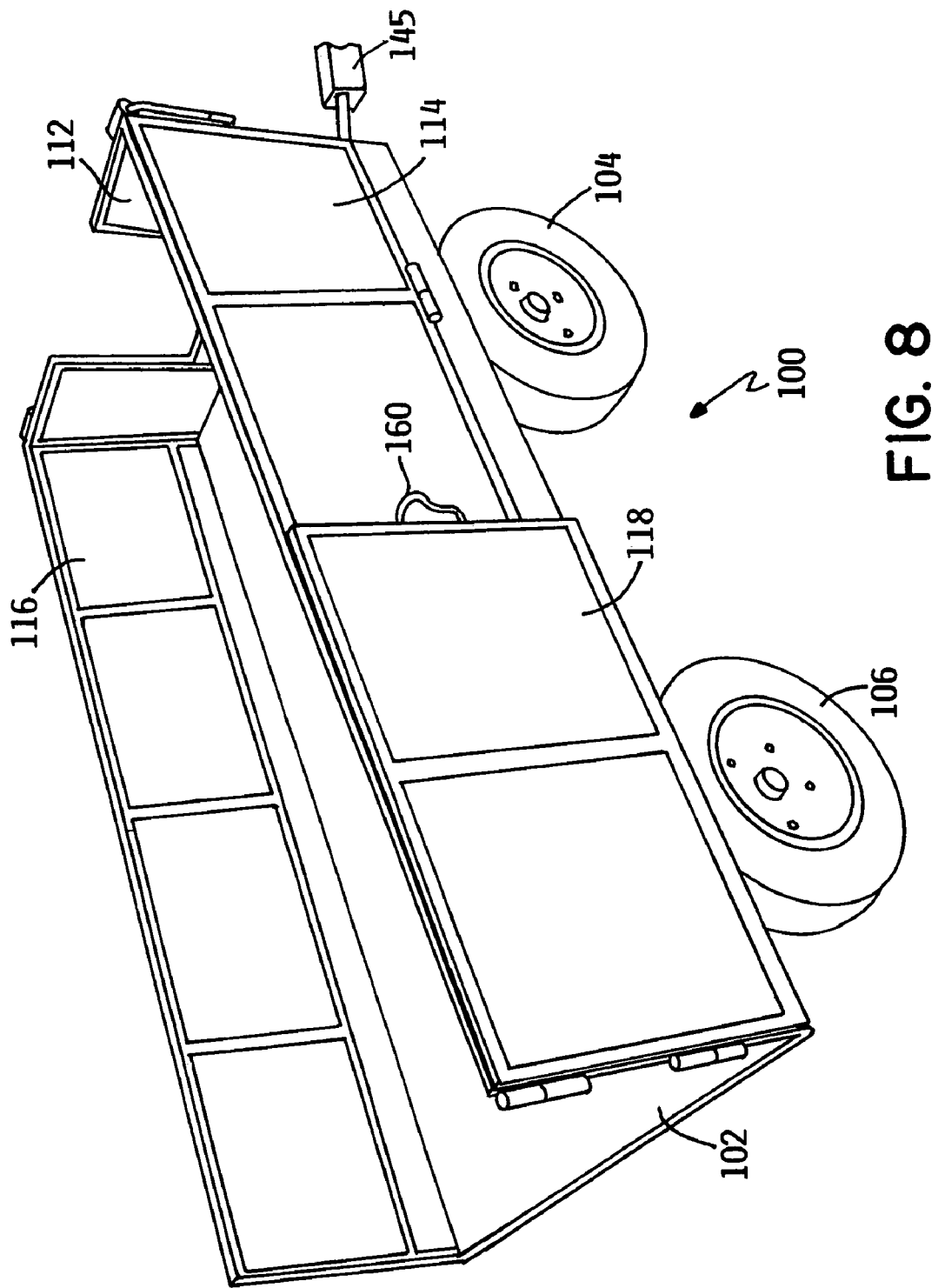
FIG. 8 is a perspective view of the dumping utility cart with the end wall engaged by a second locking means.
Figure 9:
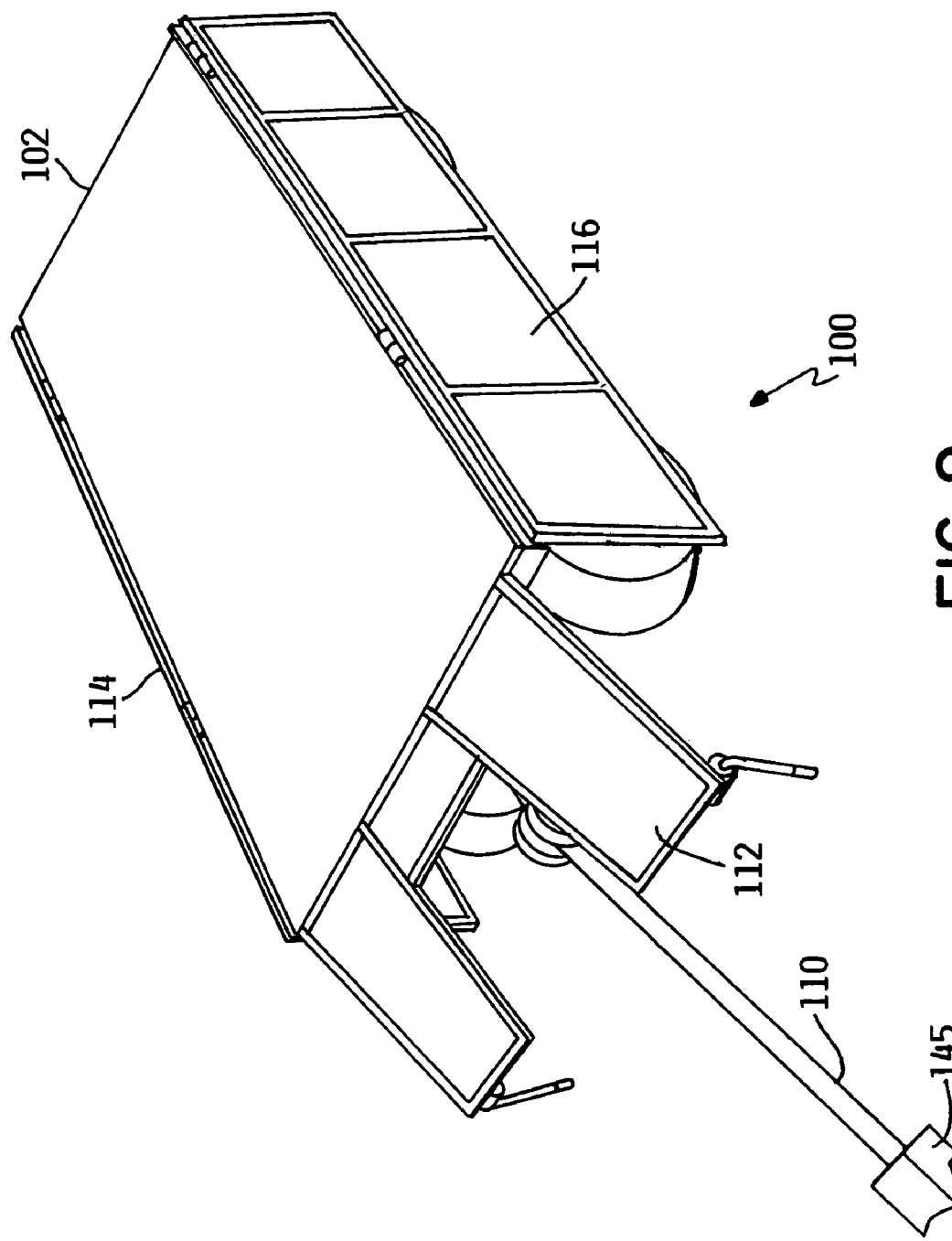
FIG. 9 is a perspective view of the dumping utility cart with side and end walls in downward position.

The rear end wall 118 is preferably pivotally attached to one of the side walls 114. The rear end wall 118 may also be pivotally attached to the article retaining bed 102. FIGS. 1 and 8 illustrate the rear end wall 118 in a locked position parallel with side wall 114. Various locking mechanisms may be employed. A frictionally engaging cotter pin 160 has been found particularly well suited for the locking means.

Through the use of wall connectors 150, 152 the front end wall 112 and side walls 114, 116 act as mutual support members. A number of mechanical devices may be employed as the wall connectors 150, 152, including but not limited to cotter pins, frictionally engaging hooks, and ball and socket joints.

The dumping utility cart 100 may be positioned through the use of the handle 110. The handle 110 is pivotally attached to the navigating mechanism 136. This connection allows for the user to easily turn and navigate the dumping utility cart 100, as the front set of wheels 104 turn in unison through the deployment of the navigating mechanism 136. The pivotal attachment 156 allows for users of various height and arm length to navigate the dumping utility cart 100 with greater comfort and ease.

In operation, the handle 110 is used to move the dumping utility cart 100 to a desired location. As the dumping utility cart 100 is being moved, the first set of wheels rotate about a first axis and the second set of wheels rotate about a second axis.

Figure 4:
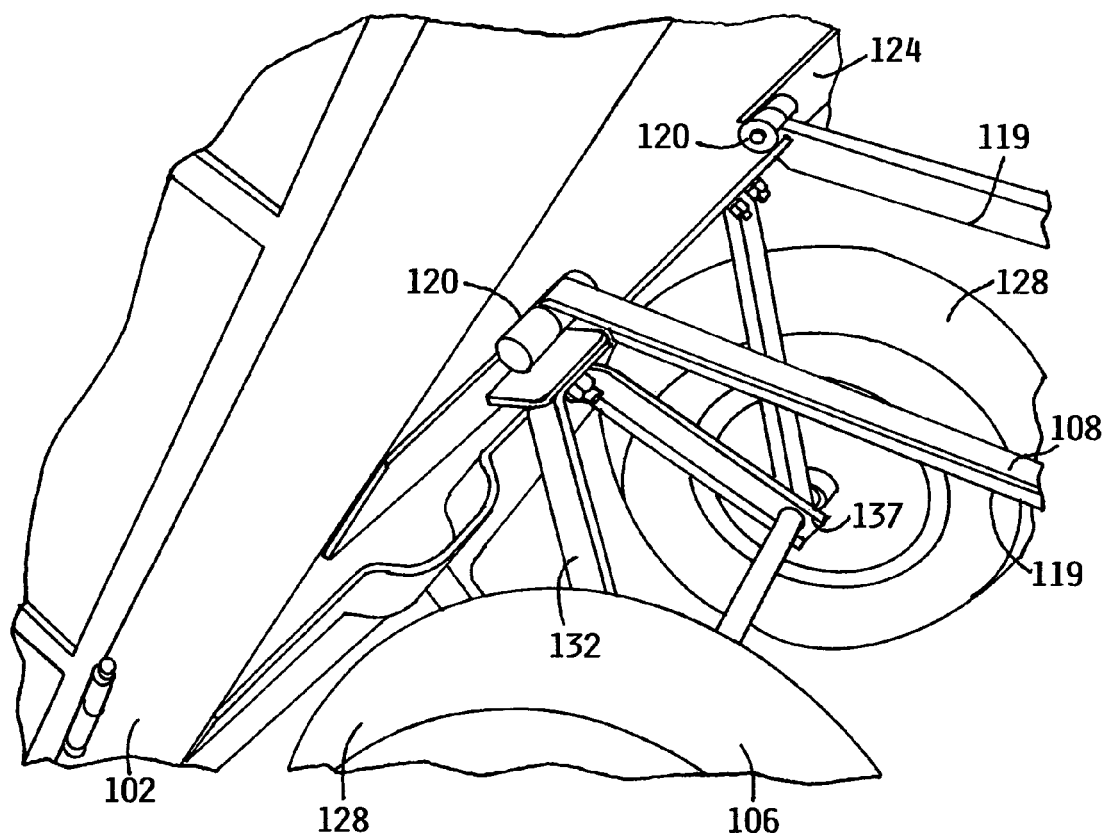
FIG. 4 is a close-up view of the dumping utility cart as shown in FIG. 3.

An individual may dump a load of material by first unlocking the locking means at lock point 122. After this disengagement an upward force exerted upon the pivot assisting handle 148 will initiate the dumping operation by pivoting the article retaining bed 102 about a third axis. An upward force may be exerted up to the point in which the article retaining bed 102 is substantially perpendicular to the ground, as shown in FIGS. 3 and 4.

In the pivoting process, the third axis is moved from a location outside the first axis and the second axis to a position that is between the first axis and the second axis. As a result of this configuration, the amount of force needed to dump the dumping utility cart 100 is significantly reduced when compared to prior art utility carts.

The preferred embodiment of the present invention has been set forth in FIGS. 1-9 and the specification. Although specific terms have been utilized, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

In an alternative embodiment not shown, the chassis may be pivotally connected to the article retaining bed at two positions. The first position being the same as described in the preferred embodiment. The second position would be proximal to the opposite end as the first position. The existence of two pivot points has a number of advantages. One being that the user may choose which end to pivot above the other end by unlocking the end opposite to where they wish to dump the load contained in the bed. Additionally, the bed may be easily removed from the chassis by unlocking each of the pivot points.

The invention claimed is:
1. A dumping cart, including:
   a load carrying bed;
   a first axle rotatably supporting a first ground engaging wheel assembly;
   a second axle rotatably supporting a second ground engaging wheel assembly; and
   an articulated chassis pivotably shiftable between a load transport configuration and a load dumping configuration, including:
      a first chassis member operably coupled to the first axle;
      a second chassis member operably coupled to the second axle, the first and second chassis members being operably, pivotably coupled together along a chassis pivot axis;
      the first and second axles attached to said respective first and second chassis members in a fixed orientation and defining a first axle separation distance when said articulated chassis is in said load transport configuration and a second axle separation distance when said articulated chassis is in said load dumping configuration, said second axle separation distance being less than said first axle separation distance.
2. The dumping cart of claim 1, further comprising a plurality of first chassis braces and a plurality of second braces, said first and second braces coupling said first and second axles to said respective first and second chassis members.
3. The dumping cart of claim 1, further comprising a plurality of braces attaching the bed to the chassis.
4. The dumping cart of claim 1, in which the chassis pivot axis is behind one of the first and second wheel axles when the chassis is in the load dumping configuration.
5. The dumping cart of claim 1, in which the bed is pivotally attached to the chassis.
6. The dumping cart of claim 1, further comprising front and rear walls and a pair of side walls attachable to the bed.
7. The dumping cart of claim 6, in which the front and rear walls and the side walls are pivotally attached to the bed.
8. The dumping cart of claim 1, in which the first second axles further comprises a steering mechanism.
9. A dumping cart, including:
   a load carrying bed;
   a front axle rotatably supporting a front wound engaging wheel assembly;
   a rear axle rotatably supporting a rear ground engaging wheel assembly; and
   an articulated chassis including:
      a front chassis member operably coupled to the front wheel axle;
      a rear chassis member operably coupled to the rear wheel axle; and
      means for operably, pivotably coupling said front and rear chassis members together for shiftably supporting said bed between a load transport position and a load dumping position.
10. The dumping cart of claim 9, wherein said coupling means comprises a pivot.
11. The dumping cart of claim 10, in which said pivot is horizontally disposed behind said rear axle when said dumping cart is in said load dumping position.
12. The dumping cart of claim 10, in which said pivot is horizontally disposed between said front and rear axles when said dumping cart is in said load transport position.
13. The dumping cart of claim 9, further comprising a front wall, a rear wall, and a pair of side walls, said front wall, said rear wall, and said side walls attachable to said bed.
14. The dumping cart of claim 13, wherein said front wall, said rear wall, and said side walls are pivotally attachable to said bed.
15. The dumping cart of claim 9, further comprising a steering mechanism coupling said front axle to said bed.
16. A dumping cart, comprising:
   a bed;
   front and rear wheel assemblies, each front and rear wheel assembly comprising at least one wheel rotating about respective front and rear wheel axes; and
   a chassis supporting the bed and articulated at a chassis pivot, said chassis configurable between a load transport position and a load dumping position, wherein said chassis pivot is intermediate said front and rear wheel axes when said chassis is in said load transport position, and wherein said chassis pivot is behind said rear wheel axis when said chassis is in said load dumping position.
17. The dumping cart of claim 16, in which said chassis pivot is characterized by a chassis pivot axis.
18. The dumping cart of claim 17, in which the chassis pivot axis is behind the rear wheel axis when the chassis is in the load dumping position.
19. The method of claim 3, further comprising forming front and rear walls and a pair of side walls attachable to the bed.

* * * * *

UNITED STATES PATENT AND TRADEMARK OFFICE
CERTIFICATE OF CORRECTION

PATENT NO.        : 7,390,065 B2
APPLICATION NO.   : 10/977254
DATED             : June 24, 2008
INVENTOR(S)       : Pieschel et al.

Page 1 of 1

It is certified that error appears in the above-identified patent and that said Letters Patent is hereby corrected as shown below:

<u>Column 5, Line 43</u>:

After "first" insert --and--.

Signed and Sealed this

Twenty-fourth Day of March, 2009

JOHN DOLL
*Acting Director of the United States Patent and Trademark Office*

UNITED STATES PATENT AND TRADEMARK OFFICE
Certificate

Patent No. 7,390,065 B2

Patented: June 24, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Frank Pieschel, Apple Valley, MN (US); Craig L. Stewart, Noblesville, MN (US); Dennis Simpson, Minnetonka, MN (US); and Jeff Skubic, Elk River, MN (US).

Signed and Sealed this Twenty-sixth Day of October 2010.

D. GLENN DAYOAN
*Supervisory Patent Examiner*
Art Unit 3612
Technology Center 3600